United States Patent [19]

Nishigai et al.

[11] Patent Number: 5,722,296
[45] Date of Patent: Mar. 3, 1998

[54] CHANGE DEVICE FOR TRANSMISSION

[75] Inventors: Yukio Nishigai; Shigeo Matsumoto, both of Shizuoka, Japan

[73] Assignee: Kabushiki Kaisha Atsumitec, Shizuoka, Japan

[21] Appl. No.: 536,635

[22] Filed: Sep. 29, 1995

[30] Foreign Application Priority Data

Jun. 9, 1995 [JP] Japan ................... 7-143057

[51] Int. Cl.⁶ .................. B60K 20/04; F16H 59/04
[52] U.S. Cl. ............. 74/473 P; 74/473 R; 384/206; 403/59; 403/353
[58] Field of Search ............. 74/473 P, 473 R; 403/53, 59, 61, 353; 384/206, 208

[56] References Cited

U.S. PATENT DOCUMENTS

| | | | |
|---|---|---|---|
| 3,589,779 | 6/1971 | Sokoi | 384/208 |
| 4,245,521 | 1/1981 | Osborn | 74/473 R X |
| 4,411,545 | 10/1983 | Roberge | 384/208 X |
| 4,879,922 | 11/1989 | Suzuki | 74/473 P X |
| 5,005,991 | 4/1991 | Heumann et al. | 384/208 |
| 5,265,965 | 11/1993 | Harris | 384/208 |
| 5,419,214 | 5/1995 | Buhl et al. | 74/473 P |
| 5,505,103 | 4/1996 | Nordstrom et al. | 74/473 P |

FOREIGN PATENT DOCUMENTS

| | | | |
|---|---|---|---|
| 214184 | 3/1961 | Austria | 403/353 |
| 2 676 260 | 11/1992 | France | |
| 37 14090A1 | 3/1988 | Germany | |
| 6-129514 | 5/1994 | Japan | 74/473 P |

OTHER PUBLICATIONS

Patent Abstracts of Japan —Publication No. 01122732, Published May 16, 1989 Applicant: Chuo Spring Co Ltd; Title: Manufacturing Device for Automobile Transmission.

*Primary Examiner*—Charles A. Marmor
*Assistant Examiner*—Troy Grabow
*Attorney, Agent, or Firm*—Nikaido Marmelstein Murray & Oram, LLP

[57] ABSTRACT

A ball joint connects a swinging shaft and a bell-crank provided on a change lever for transmitting a swinging movement of the change lever in a select direction to the bell-crank. The ball joint includes a ball having a pair of flat surfaces for defining a width smaller than the maximum diameter of the ball, a ball hole which is formed at one end of the bell-crank and in which the ball is rotatably fitted, a shaft hole which formed in the ball so as to open through both the flat surface and in which the swinging shaft of the change lever is slidably fitted. A rotation of the ball in the ball hole permits a relative swinging movement between the swinging shaft and the bell-crank. A sliding movement of the swinging shaft in the shaft hole permits an axial displacement of the swinging shaft with respect to the bell-crank.

1 Claim, 7 Drawing Sheets

CHANGE DEVICE FOR TRANSMISSION

BACKGROUND OF THE INVENTION

1. Field of the Invention

The present invention relates to a change device for a transmission, and more particularly, to an improvement of a change device for a transmission, comprising: a change lever capable of swinging in a select direction and a shift direction and mounted to a lever bracket; a bell-crank capable of swinging in a direction perpendicular to said select direction and also mounted on said lever bracket; a swinging shaft mounted on said change lever for swinging movement with a swinging movement of said change lever in said select direction, said swinging shaft being connected to one end of said bell-crank through a ball joint; a select operation member connected to the other end of said bell-crank; and a shift operation member connected to said change lever.

2. Description of the Prior Art

Such a change device is already known from, e.g., Japanese Utility Model Publication No. 39776/88. A ball joint in this known device includes a ball integrally formed at a tip end of a swinging shaft, a ball socket relatively rotatably fitted to an outer peripheral surface of the ball, and a connection hole formed at one end of a bell-crank for slidably receiving the ball socket.

In the known device, a forging and cutting processes which are expensive must be carried out for manufacturing the swinging shaft having a ball. Further, the ball socket must be provided between the ball and the bell-crank for permitting the relative rotation and slide movement therebetween. Therefore, the structure is complicated, and manufacturing cost becomes expensive.

SUMMARY OF THE INVENTION

The present invention has been accomplished in view of the above circumstances, and it is an object of the present invention to provide a change device which makes it possible to manufacture the ball alone and which includes a less expensive ball joint having a simple structure.

To achieve the above object, according to a first feature of the present invention, there is provided a change device for a transmission, comprising: a change lever capable of swinging in a select direction and a shift direction and mounted on a lever bracket; a bell-crank capable of swinging in a direction perpendicular to the select direction and also mounted on the lever bracket; a swinging shaft mounted on the change lever for swinging movement with a swinging movement of the change lever in the select direction, the swinging shaft being connected to one end of the bell-crank through a ball joint; a select operation member connected to the other end of the bell-crank; and a shift operation member connected to the change lever; wherein the ball joint comprises a ball hole having a spherical inner surface formed at one end of the bell-crank, a ball rotatably fitted in the ball hole, and a shaft hole formed in the ball so as to pass through the center thereof and slidably fitted to the swinging shaft.

In addition to the first feature, according to a second feature of the invention, opposite sides of the ball through which the shift hole opens is formed with a pair of flat surfaces each defining a width smaller than a maximum diameter of the ball, at least one of opening edges of the ball hole is provided with a pair of notches such as to be opposed to each other, the notches having widths larger than the width of the ball and reaching a maximum diameter portion of the inner peripheral surface of the ball, the ball being rotatably fitted in the ball hole through the notches.

In addition to the second feature, according to a second feature of the invention, the ball hole is provided at one of the opening edges with a pair of mutually opposed first notches, and at the other opening edge with a pair of mutually opposed second notches which are displaced in phase through 90° with respect to the first notches in a peripheral direction of the ball hole, a sum of central angles corresponding to widths of both the first notches and a central angle corresponding to widths of both the second notches is set to be 360°.

With the first feature, during a select operation of the change lever, a relative swinging movement of the swinging shaft and the bell-crank can be permitted by a rotation of the ball in the ball hole of the bell-crank, and an axial displacement of the swinging shaft with respect to the bell-crank can be permitted by a sliding movement of the swinging shaft in the shaft hole of the ball. Therefore, a swinging movement of the swinging shaft can smoothly be transmitted to the bell-crank.

The ball is separated from the swinging shaft and a shape of the ball is simple. Therefore, it is possible to relatively easily form the ball by an injection molding. Further, the ball hole to which the ball is fitted is directly provided on the bell-crank, which unnecessitates an exclusive ball socket and thus, a manufacturing cost can be reduced.

With the second feature, the ball can be inserted to the ball hole through the notches formed at the opening edges of the ball hole. After insertion of the ball, by rotating the ball in the ball hole and fitting the swinging shaft in the shaft hole, it is possible to prevent the ball from being disengaged from the notches. Therefore, the assembling of the ball joint is easy, and it is unnecessary to provide a special means for preventing the ball from being disengaged, which can further reduce the manufacturing cost.

With the third feature, when the bell-crank is formed by the injection molding, it is possible to simultaneously form the ball hole and the pair of the first and the second notches by using a simple two-part metal mold.

The above and other objects, features and advantages of the invention will become apparent from preferred embodiments taken in conjunction with the accompanying drawings.

BRIEF DESCRIPTION OF THE DRAWINGS

FIGS. 1 to 9 illustrate one embodiment of the present invention, wherein:

DESCRIPTION OF THE PREFERRED EMBODIMENT

The present invention will now be described by way of preferred embodiments taken in conjunction with the accompanying drawings.

Figure 1:
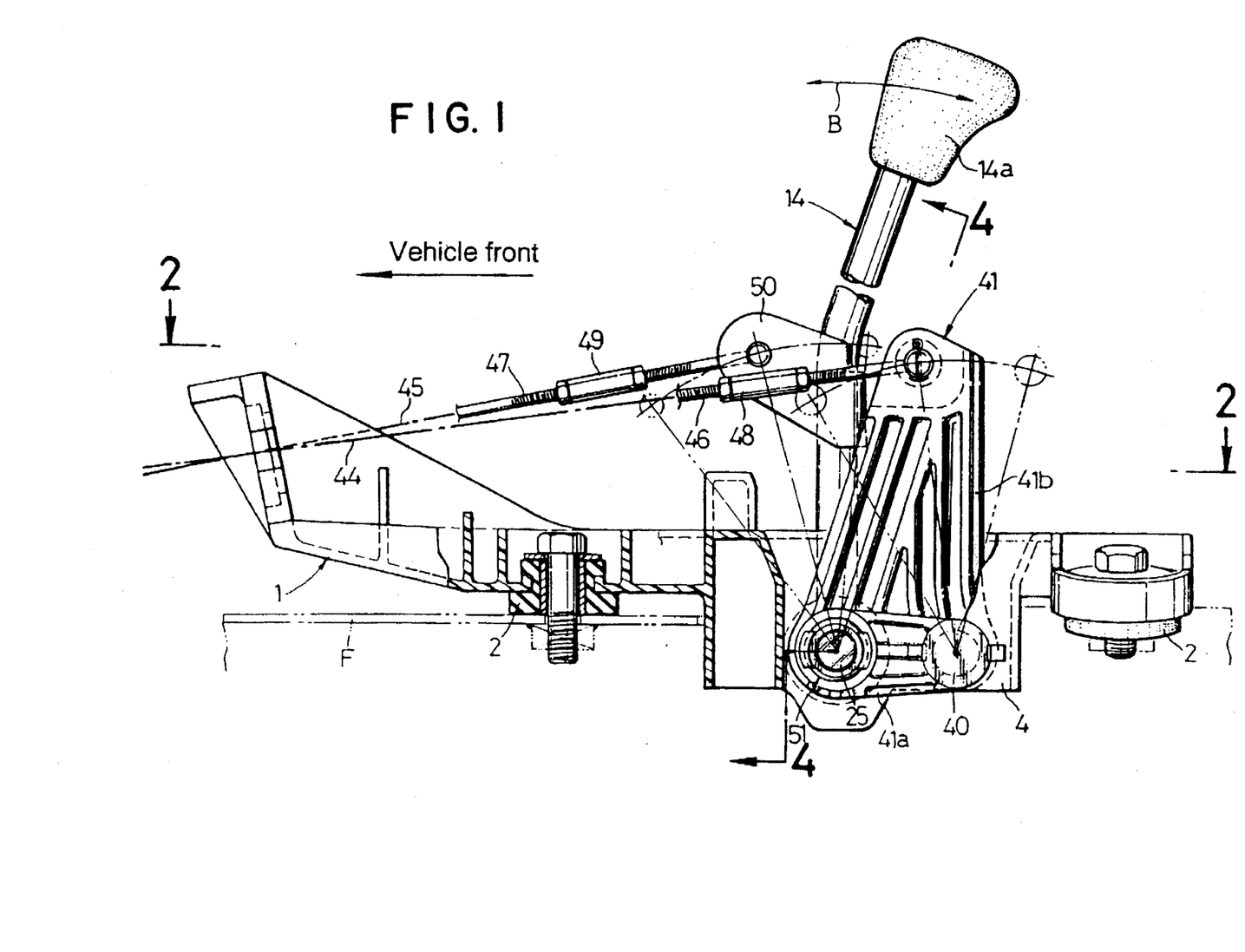
FIG. 1 is a side view of a change device for an automobile, partly in longitudinal section.
Figure 2:
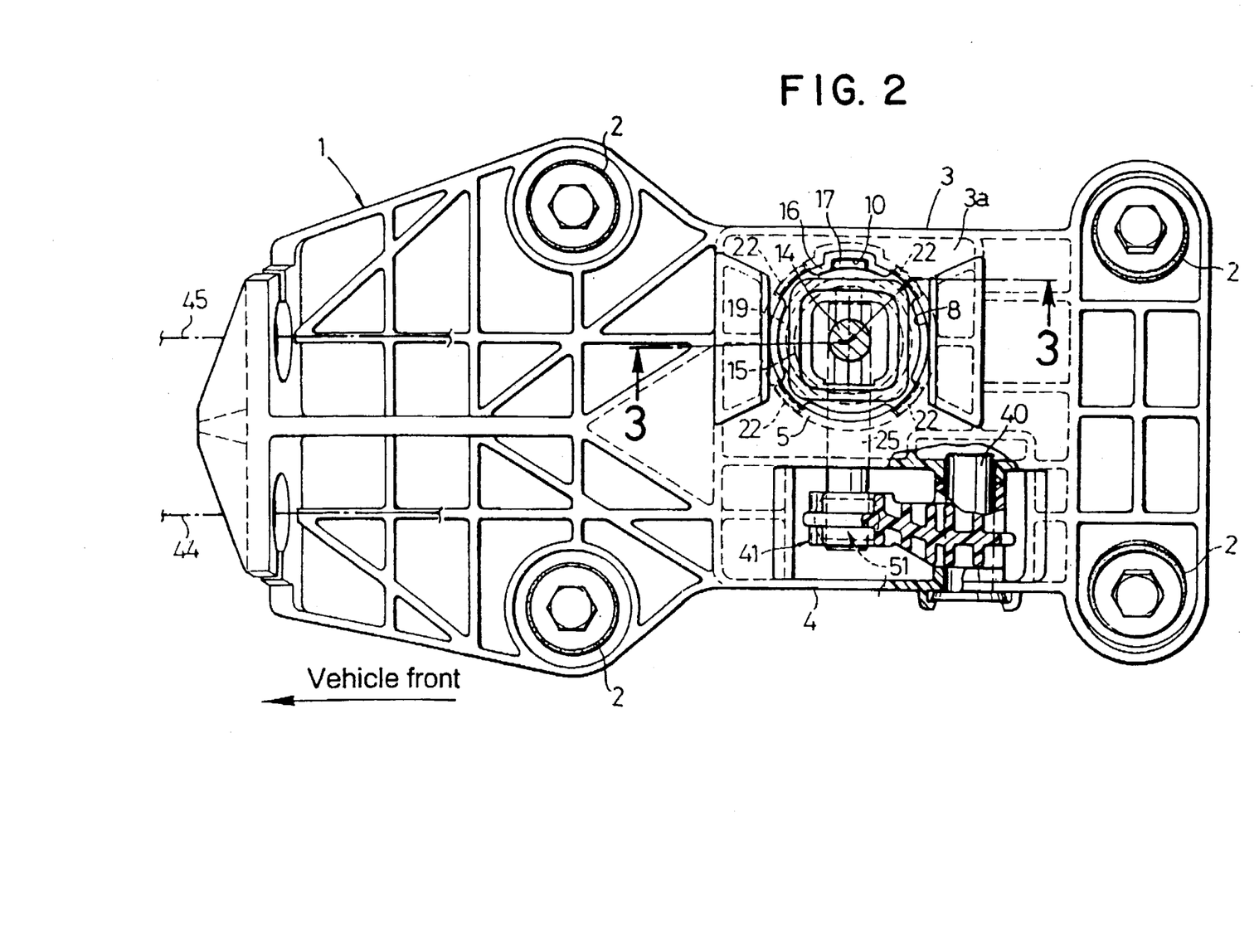
FIG. 2 is a sectional view taken along a line 2—2 in FIG. 1.
Figure 3:
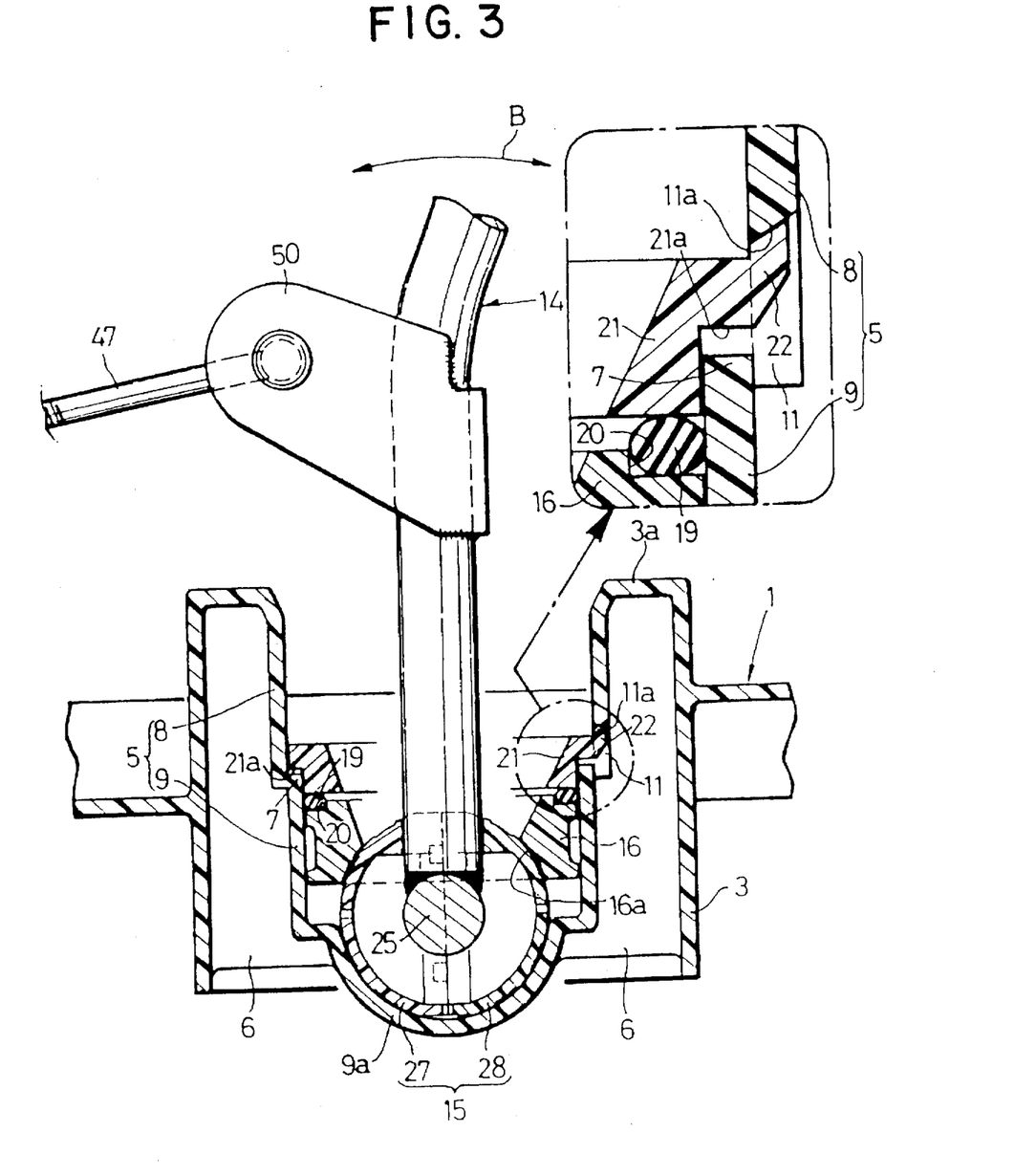
FIG. 3 is an enlarged longitudinal sectional view taken along a line 3—3 in FIG. 2.
Figure 4:
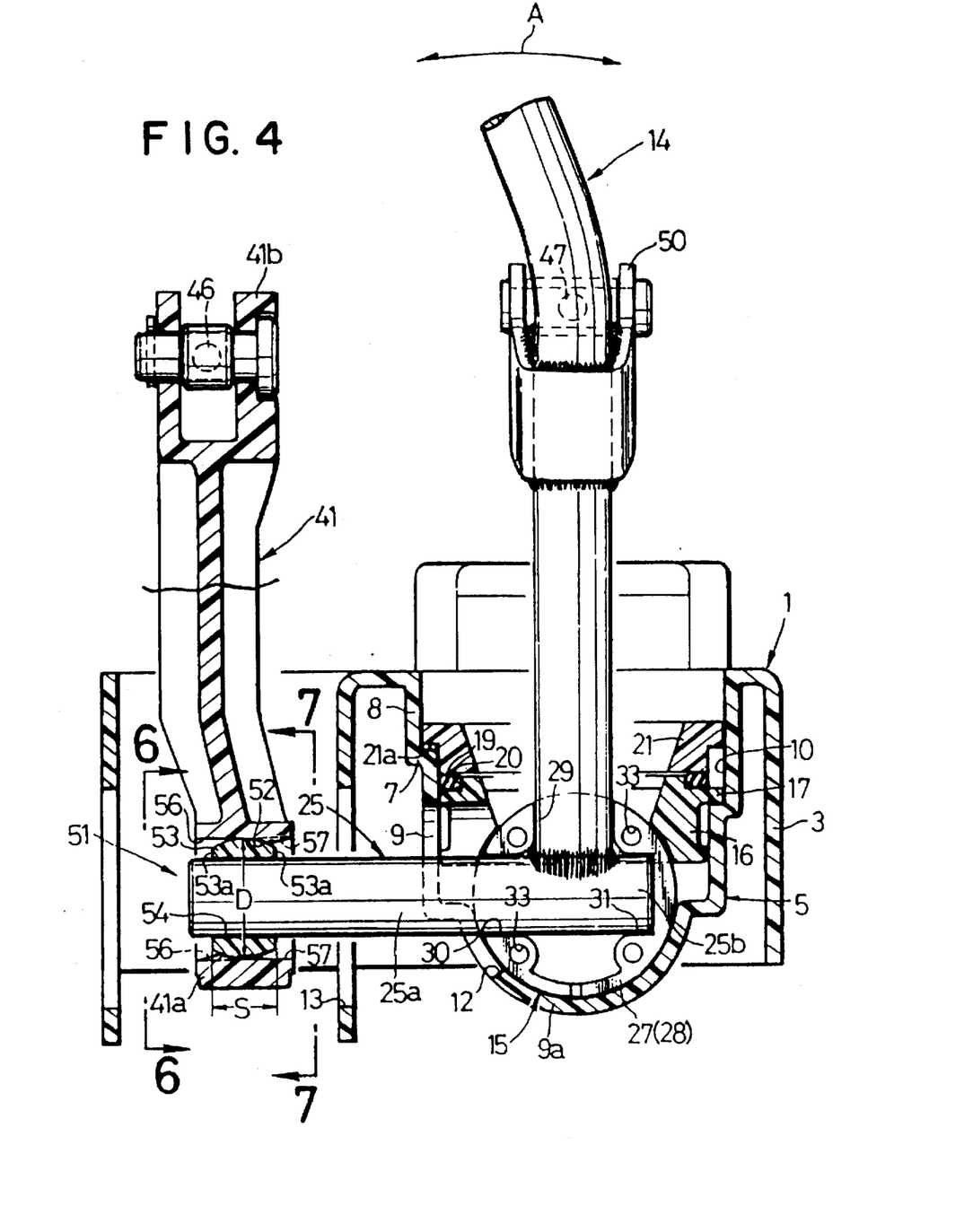
FIG. 4 is an enlarged longitudinal sectional view taken along a line 4—4 in FIG. 1.

First, referring to FIGS. 1 to 4, a lever bracket 1 made of resin is mounted on a floor board of a motor vehicle through a mount rubber 2. The lever bracket 1 is integrally provided with first and second towers 3 and 4 which are juxtaposed in a lateral direction of the motor vehicle and which commonly includes a partition wall (FIGS. 2 and 4). The first tower 3 is of substantially square in section, and is opened at its lower surface. The second tower 4 is rectangular which is long in a longitudinal direction of the motor vehicle and opened at its upper and lower ends.

As can be seen from FIGS. 3 and 4, the first tower 3 is integrally and continuously formed with a housing 5 which is suspended downward from an upper end wall 3a of the first tower 3 along an axis of the tower 3. Opposed peripheral surfaces of the housing 5 and the first tower 3 are connected by a plurality of radial reinforcing ribs 6. The housing 5 includes an upper large-diameter cylindrical portion 8 and a lower small-diameter cylindrical portion 9 which are juxtaposed so as to sandwich a step portion 7 provided at an intermediate portion of the housing 5. The small-diameter cylindrical portion 9 includes a hemispherical bottom wall 9a. The small-diameter cylindrical portion 9 is formed in an inner surface thereof with a guide groove 10 which extended vertically. (see FIGS. 2 and 4).

A plurality of engagement holes 11 are formed in the large-diameter cylindrical portion 8 so as to face the step portion 7. Vertically slotted holes 12 and 13 are formed in opposed side walls of the small-diameter cylindrical portion 9 and the second tower 4.

A spherical fulcrum member 15 of the change lever 14 is rotatably engaged with the hemispherical bottom wall 9a of the small-diameter cylindrical portion 9. An annular cap 16 made of resin is relatively rotatably engaged with the fulcrum member 15 from the above and is fitted to an inner peripheral surface of the small-diameter cylindrical portion 9. At that time, a rotation-proof projection 17 (FIGS. 2 and 5) projected from one side surface of the cap 16 is engaged with the guide groove 10. A surface 16a of the cap 16 which is in contact with an outer peripheral surface the fulcrum member 15 is formed into a spherical surface so as to fit such outer peripheral surface.

The cap 16 is formed at its outer periphery of the upper end thereof with an annular recess 20 for holding an elastic ring 19 such as an O-ring. A substantially upper half of the ring 19 is exposed, in its free state, from an upper surface of the cap 16. An annular retainer 21 (FIG. 5) made of resin for compressing the elastic ring 19 from the above so as to press and hold the cap 16 is fitted to inner peripheral surfaces of the large- and small-diameter cylindrical portions 8 and 9. A plurality of elastic engagement claws 22 projected from an outer periphery of the retainer 21 are engaged with the engagement holes 11.

As can be seen from FIG. 3, a tip end of the engagement claw 22 is inclined upward. When the retainer 21 is to be fitted to the large-diameter cylindrical portion 8, the engagement claw 22 is deflected inward by an inner surface of the large-diameter cylindrical portion 8, and when the engagement claw 22 reaches a position corresponding to the engagement hole 11, the engagement claw 22 engages the engagement hole 11 by its own resilient force.

An upper surface 11a of the engagement hole 11 is also inclined upward in a radially outward direction. Therefore, if the engagement claw 22 engaging the engagement hole 11 receives an upward repulsion force from the elastic ring 19, the engaging force between the engagement claw 22 and the engagement hole 11 can further be enhanced. The retainer 21 is provided with a step portion 21a which is opposed to the step portion 7 of the housing 5, so that when the retainer 21 is fitted to the housing 5, the compression deformation of the elastic ring 19 by abutment between both the step portions 7 and 21a can be restrained.

In this manner, the fulcrum member 15 is rotatably interposed between the cap 16 and the bottom wall 9a of the housing 5 with a repulsion force of the elastic ring 19.

As can be seen from FIGS. 1 and 4, the change lever 14 is provided at its upper end with a knob 14a. A laterally extending swinging shaft 25 is welded to a lower end of the change lever 14 such as to cross to form a T-shape.

The swinging shaft 25 includes long shaft portion 25a and short shaft portion 25b. The long shaft portion 25a largely projects from one side of the change lever 14 to pass through the slotted holes 12 and 13 and extends into the second tower 4. The short shaft portion 25b slightly projects from the other side of the change lever 14. The fulcrum member 15 is secured to a junction between the main and the swinging shaft 24 and the change lever 14 so as to cover the junction.

Figure 5:
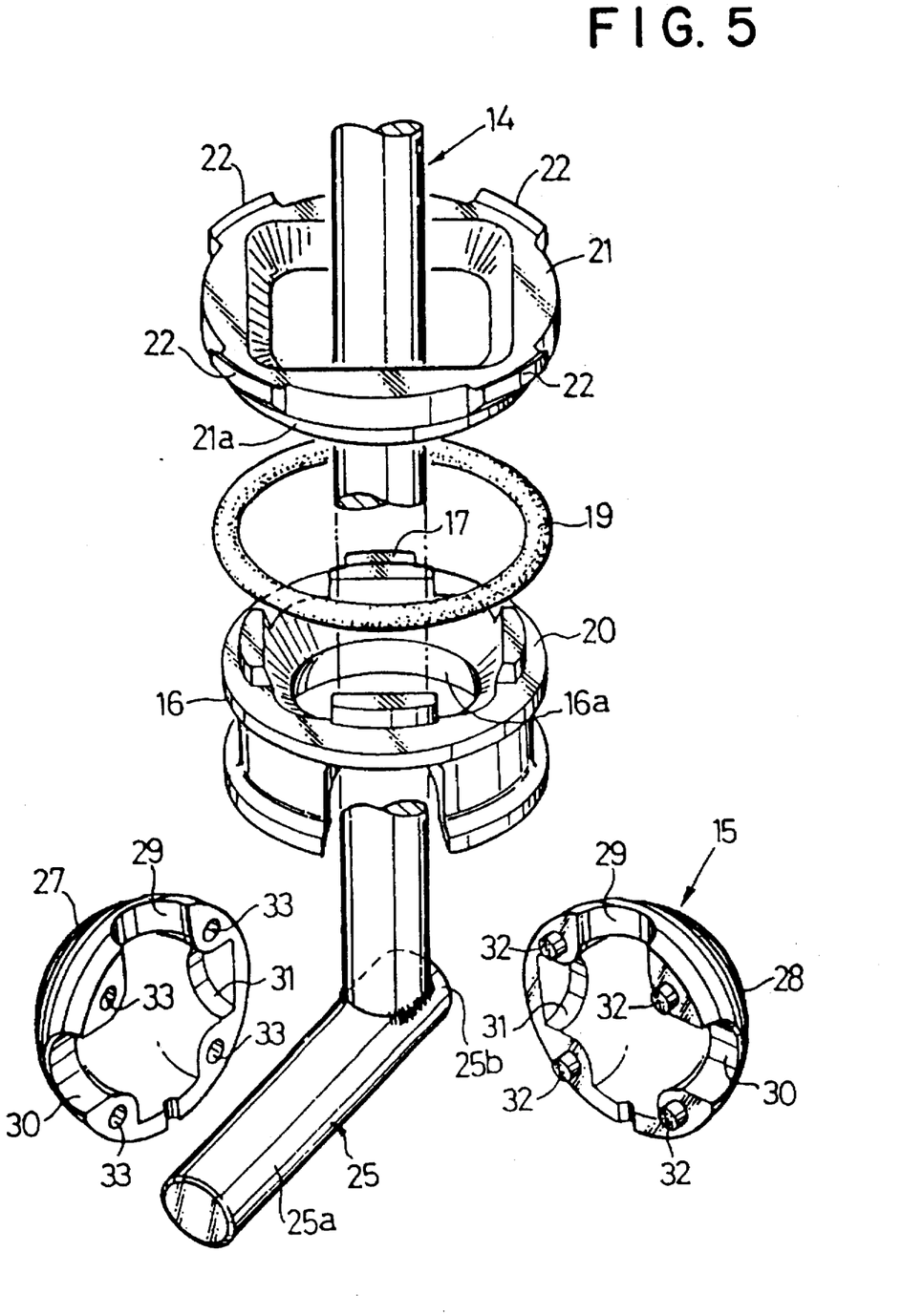
FIG. 5 is an exploded perspective view of a portion of the change device around a fulcrum member.

More specifically, the fulcrum member 15 is formed into a hollow structure by coupling a pair of cup-like hemispherical bodies 27 and 28 made of resin, as shown in FIGS. 3 to 5. The hemispherical bodies 27 and 28 have basically symmetrical shapes with respect to a mating surface therebetween. Each of the hemispherical bodies 27 and 28 is formed at an end surface thereof with supporting recesses 29, 30 and 31 extending in three directions. These supporting recesses 29, 30 and 31 are fitted to outer peripheries of the change lever 14, as well as the long and short shaft portions 25a and 25b of the swinging shaft 25. At that time, centers of both the hemispherical bodies 27 and 28 agree with a junction of axes of the change lever 14 and the swinging shaft 25.

A plurality of positioning projections 32 are formed at an end surface of one of the hemispherical bodies 27 and 28, and a plurality of positioning holes 33 are formed at an end surface of other of the hemispherical bodies 27 and 28. By lightly fitting the positioning projections 32 into the positioning holes 33, both the hemispherical bodies 27 and 28 can temporarily be coupled.

The coupling state between the hemispherical bodies 27 and 28 is reliably retained by sandwiching them between the cap 16 and the bottom wall 9a of the housing 5, as described above.

As is shown in FIGS. 1, 2 and 4, a bell-crank 41 made of resin is mounted to the second tower 4 through a horizontal pivot shaft 40. The bell-crank 41 includes a horizontal arm 41a having a swinging end extended forward, and a vertical arm 41b having a swinging end extended upward. The long shaft portion 25a of the swinging shaft 25 is connected to a front end of the horizontal arm 41a through a ball joint which will be described hereinafter. One end of a push-pull select operation wire (a select operation member) 44 is connected to an upper end of the vertical arm 41b through a rod 46 having a turnbuckle 48.

As is shown in FIGS. 1 and 3, one end of a push-pull shift operation wire 45 (shift operating member) is connected to a connection piece 50 connected to an intermediate portion of the change lever 14 through a rod 47 having a turnbuckle 49.

The other ends of the select operation wire 44 and the shift operation wire 45 are respectively connected to a select operation member and a shift operation member of a transmission (not shown).

The ball joint 51 will be described below with reference to FIGS. 6 to 9. The ball joint 51 includes: a ball hole 52 formed at a front end of the horizontal arm 41a and having a spherical inner surface, a ball 53 made of a resin and rotatably fitted in the ball hole 52, and shaft hole passing though the center of the ball 53. The ball hole 52 is opened at its opposite ends into left and right side surfaces of the horizontal arm 41a. The long shaft portion 25a of the swinging shaft 25 is slidably fitted into the shaft hole 54.

Figure 9:
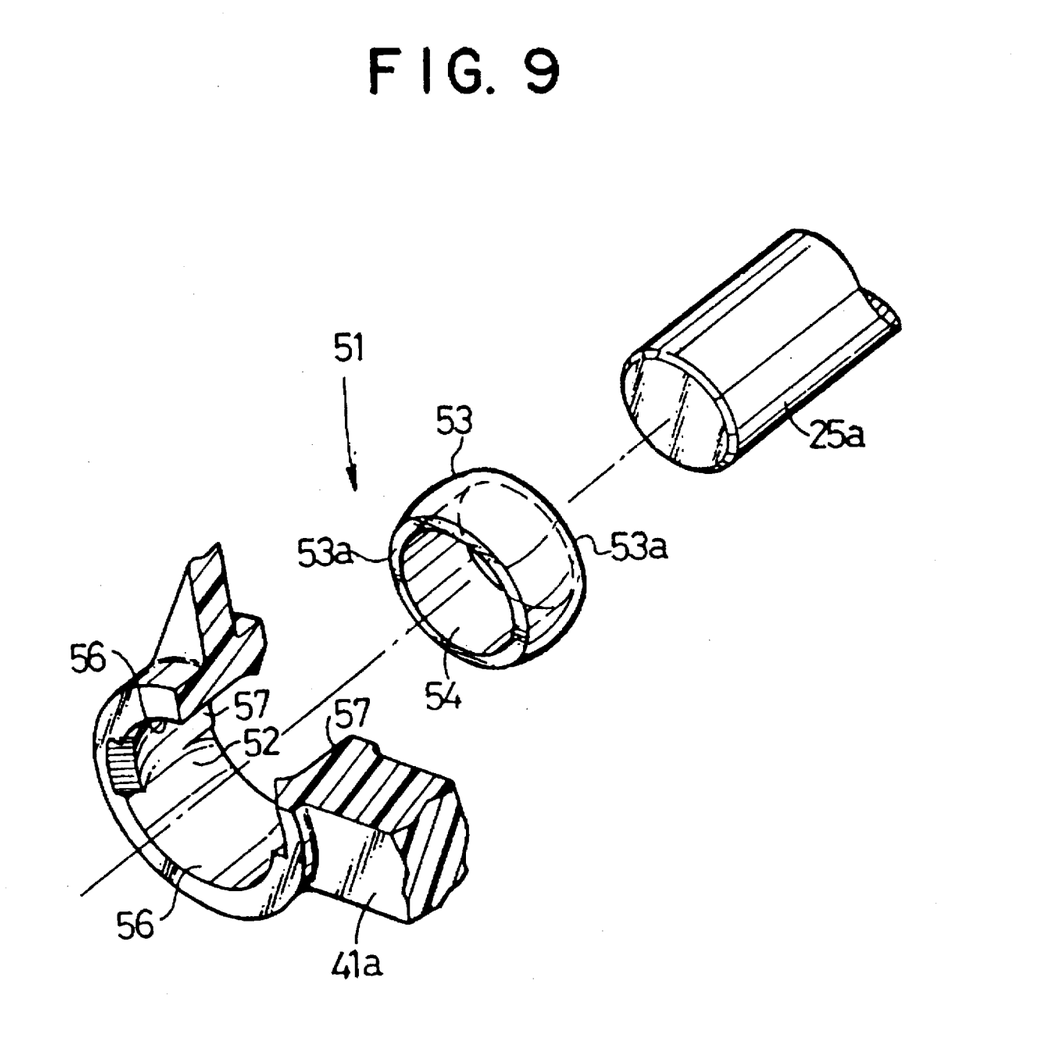
FIG. 9 is an exploded perspective view of the ball joint.

The ball 53 has flat surfaces 53a and 53a formed by cutting opposite ends along an axis of the shaft hole 54, thereby defining a width S of the ball 53 which is smaller than the maximum diameter D of the ball 53.

Figure 6:
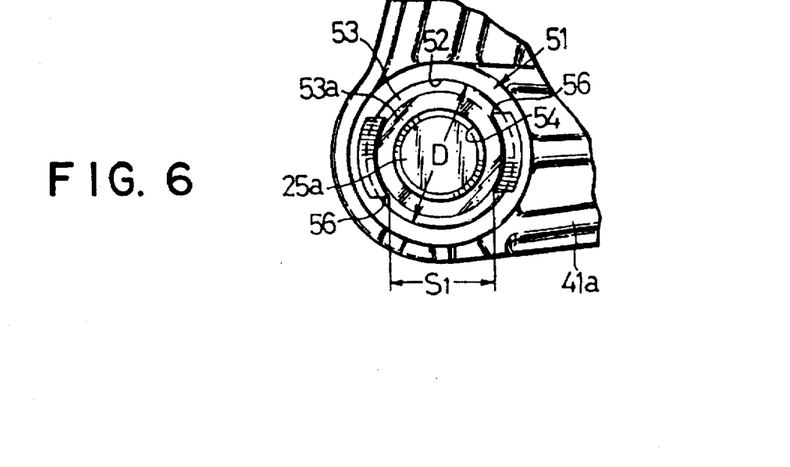
FIG. 6 is a view taken along an arrow 6—6 in FIG. 4.
Figure 7:
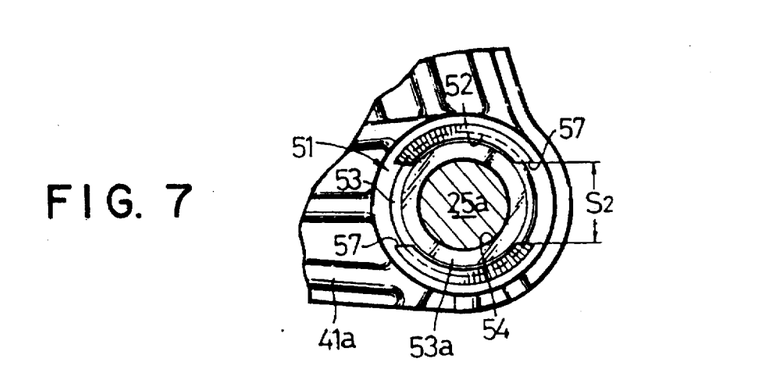
FIG. 7 is a sectional view taken along an arrow 7—7 in FIG. 4.

The ball hole 52 is formed at its one and the other open edges with first notches 56 and 56, and second notches 57 and 57, respectively, such as to reach the maximum diameter portion of the ball hole 52. In forming such notches, the first notches 56 and 56 and the second notches 57 and 57 are displaced in phase by 90° in a circumferential direction of the ball hole 52. The first and second notches are formed to have widths S1 and S2, respectively, which are larger than the width S of the ball 53. Further, the widths S1 and S2 of the first and second notches are set such that a sum of central angles corresponding to the widths (2×S1) of both the first notches 56 and 56 (i.e., a sum of central angles of the ball hole 52 defined between opposite ends of each of the widths S1), and central angles corresponding to the widths (2×S2) of both the second notches 57 and 57 (i.e., central angles of the ball hole 52 defined between opposite ends of each of the widths S2) becomes 360°. With this arrangement, when the bell-crank 41 is formed by the injection molding, the ball hole 52, as well as the first and second notches 56 and 57 can simultaneously be formed by a simple two-part metal mold.

Figure 8:
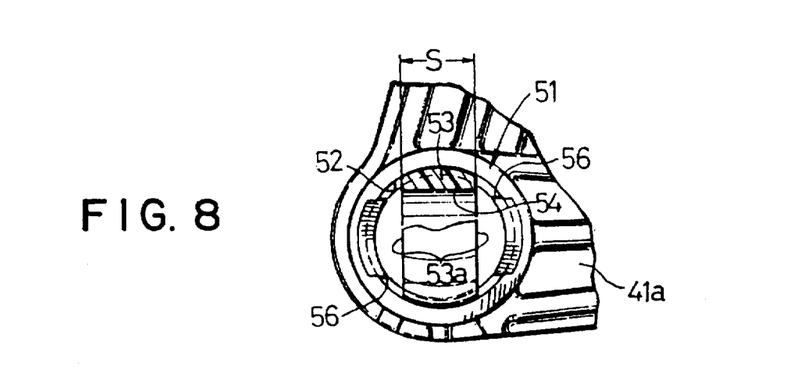
FIG. 8 is a view for explaining a process for assembling a ball joint of the change device.

When assembling the ball joint 51, the ball 53 is first inserted in the ball hole 52 through the first notches 56 and 56, or through the second notches 57 and 57, in a state in which the axis of the shaft hole 54 of the ball 53 is rotated through 90° with respect to the axis of the ball hole 52, as shown in FIG 8. Next, the ball 53 is rotated such that the axis of the shaft hole 54 matches the axis of the ball hole 52 as shown in FIGS. 6 and 7. Then, the long shaft portion 25a of the swinging shaft 25 is fitted in the shaft hole 54.

The operation of the embodiment of the present invention having the above-described construction will be described below.

If an operator grasps the knob 14a and moves the change lever 14 in a select direction A (in a lateral direction of the vehicle as shown in FIG. 4) about the fulcrum member 15, the swinging shaft 25, which swings vertically, drives the horizontal arm 41a of the bell-crank 41 so as to swing the vertical arm 41b in a longitudinal direction of the vehicle. Therefore, a select motion is applied to the transmission through the select wire 44, and a desired gear train is selected. Then, if the operator turns the change lever 14 about the fulcrum member 15 in a shift direction B (in a longitudinal direction of the vehicle), a shift motion is applied to the transmission through the shift wire 45, thereby establishing the previously selected gear train.

In the ball joint 51, when the change lever 14 is swung in the select direction A, the rotation of the ball 53 within the ball hole 52 permits a relative swinging movement between the swinging shaft 25 and the horizontal arm 41a. Further, the swinging movement of the swinging shaft 25 within the shaft hole 54 of the ball 53 permits an axial displacement of the swinging shaft 25 with respect to the horizontal shaft 41a. Therefore, the swinging movement of the swinging shaft 25 can smoothly be transmitted to the bell-crank 41.

The ball 53 is separated from the swinging shaft 25, and the shape of the ball 53 is simple. Therefore, it is possible to form the ball 53 by the relatively inexpensive injection molding.

Further, the ball hole 52 in which the ball is fitted is directly mounted to the horizontal arm 41a of the bell-crank 41. Therefore, the bell-crank 41 also serves as a ball socket, thereby further simplifying the entire structure.

Furthermore, the ball 53 can easily be fitted into the ball hole 52 through the first notches 56 and 56, or through the second notches 57 and 57, and moreover, after the swinging shaft 25 is fitted to the shaft hole 54, the ball is prevented from being disengaged from the notches 56, 56; 57, 57. Therefore, it is unnecessary to provide any special means for preventing the ball 53 from being disengaged.

Although the embodiments of the present invention have been described in detail, it will be understood that the present invention is not limited to the above-described embodiments, and various modifications in design may be made without departing from the spirit and scope of the invention defined in claims. For example, the change lever may be supported on the lever bracket 1 through a universal joint using two shafts, instead of through the fulcrum member 15.

What is claimed is:

1. A change device for a transmission, comprising:

a change lever capable of swinging in a select direction and a shift direction and mounted on a lever bracket;

a bell-crank capable of swinging in a direction perpendicular to said select direction and also mounted on said lever bracket;

a swinging shaft mounted on said change lever for swinging movement with a swinging movement of said change lever in said select direction, said swinging shaft being connected to one end of said bell-crank through a ball joint;

a select operation member connected to the other end of said bell-crank; and a shift operation member connected to said change lever;

said ball joint comprising a ball hole having a spherical inner peripheral surface formed at one end of said bell-crank, a ball rotatably fitted in said ball hole, and a shaft hole formed in said ball so as to pass through the center thereof and slidably fitted to said swinging shaft, opposite sides of said ball through which said shaft hole opens being formed with a pair of flat surfaces defining a width smaller than a maximum diameter of said ball, at least one of opposite opening edges of said ball hole being provided with a pair of notches such as to be opposed to each other, said notches having widths larger than said width of said ball and reaching a maximum diameter portion of the inner peripheral surface of said ball, said ball being rotatably fitted in said ball hole through said notches, said ball hole being provided at one of said opening edges with a pair of mutually opposed first notches, and at the other opening edge with a pair of mutually opposed second notches, each of which is displaced in phase through 90° with respect to one of said first notches in a peripheral direction of said ball hole, a sum of central angles corresponding to widths of both said first notches and central angles corresponding to widths of both said second notches being set to be 360°.

* * * * *